United States Patent

Goff

[11] 3,935,790
[45] Feb. 3, 1976

[54] INTEGRAL POWER STEERING ASSEMBLY

[75] Inventor: Raymon L. Goff, Lafayette, Ind.

[73] Assignee: TRW Inc., Cleveland, Ohio

[22] Filed: Feb. 11, 1974

[21] Appl. No.: 441,033

[52] U.S. Cl. .................. 91/375 A; 91/451; 92/79; 60/336
[51] Int. Cl.² .................. F15B 9/10; F15B 21/04
[58] Field of Search ............ 92/79; 60/336; 91/449, 91/450, 451, 452, 375 A

[56] References Cited
UNITED STATES PATENTS

| | | | |
|---|---|---|---|
| 3,137,213 | 6/1964 | Bryant et al. | 92/79 |
| 3,316,817 | 5/1967 | Ellis | 92/79 |
| 3,367,354 | 2/1968 | Gallant | 91/452 |
| 3,489,065 | 1/1970 | Forster et al. | 92/79 |
| 3,564,975 | 2/1971 | Moran | 91/450 |

*Primary Examiner*—Paul E. Maslousky
*Attorney, Agent, or Firm*—McGlynn and Milton

[57] ABSTRACT

An integral power steering assembly of the type which includes a housing defining a power cavity with a rack-toothed piston movably supported in the cavity and in meshing engagement with a sectored gear which in turn rotates an output shaft. A control valve is supported by the housing for controlling the flow of pressurized fluid from a source to the cavity on one side or another of the piston and the return flow from the opposite side of the piston whereby the piston is moved in alternative and opposite directions. An input shaft forms a part of and controls the control valve. Mechanical connections also interconnect the input shaft and an output shaft for rotating the output shaft in response to rotation of the input shaft in the event of the lack or loss of fluid pressure to move the piston hydraulically. These components are in the form of an integral or unitized package which may be attached to a vehicle as one unit. The improvement comprises a bleed valve establishing communication between the power cavity in which the piston is disposed and the return line from the control valve for automatically bleeding air from the hydraulic power cavity in which the piston is disposed. The bleed valve includes a valve member slidably disposed in a passage and normally held away from a valve seat by a spring. The valve member allows air to pass thereby but as the hydraulic fluid pressure increases, the valve member will be moved against the seat to prevent the flow of hydraulic fluid from the power cavity to the return.

14 Claims, 1 Drawing Figure

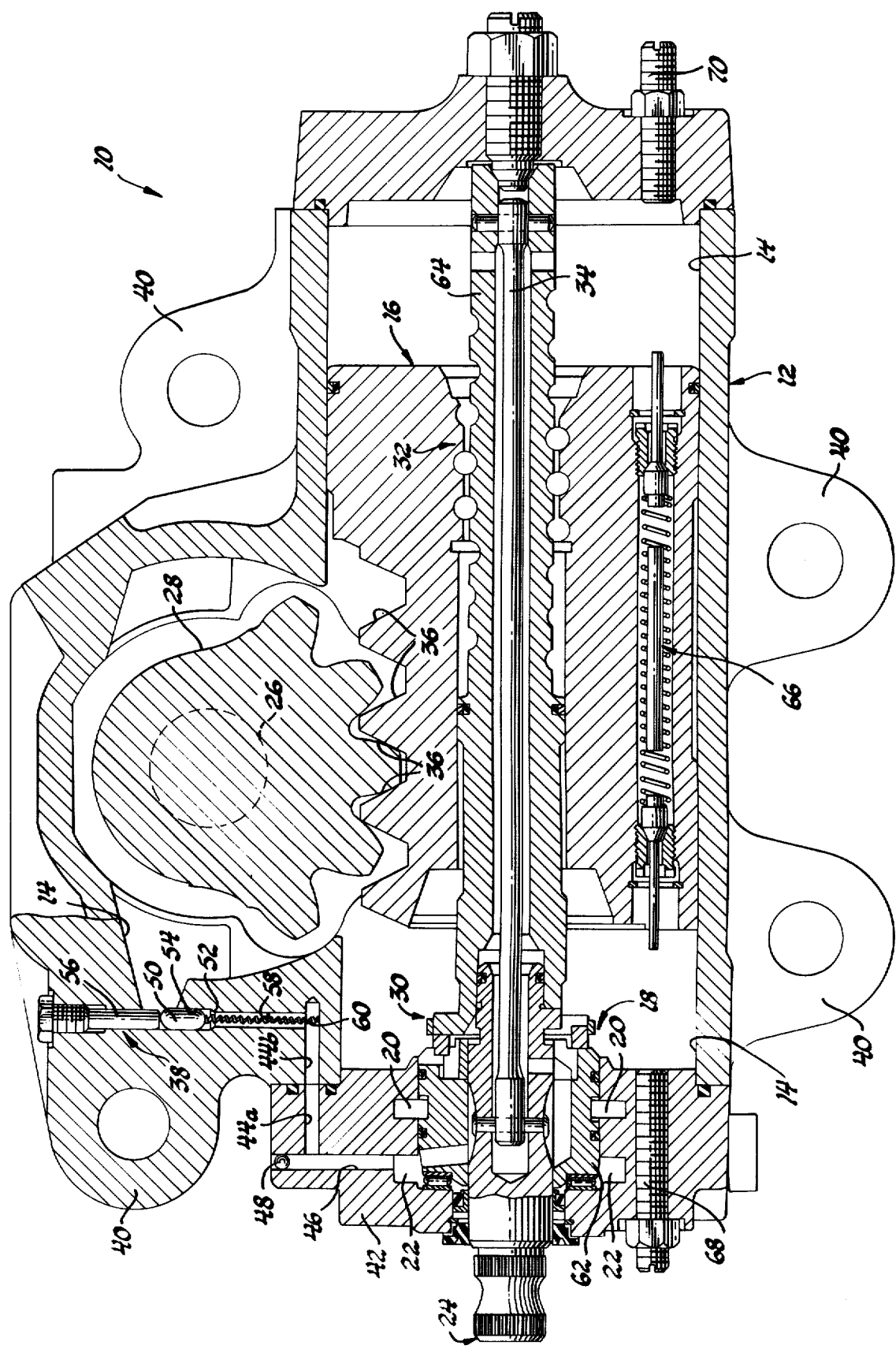

INTEGRAL POWER STEERING ASSEMBLY

BACKGROUND OF THE INVENTION

The present invention relates generally to the field of pressurized fluid operated servo mechanisms and, more specifically, to an integral power steering gear assembly for providing a power assist to the manual control of the steering wheels of a vehicle.

Power steering assemblies of the integral type are defined by a single unitary package including an input shaft to control the position of a control valve which controls the flow of pressurized fluid to opposite ends of a piston, which, in turn, controls the position of an output shaft. Additionally, there is a mechanical interconnection between the input shaft and the output shaft which may be utilized or becomes effective upon the loss of hydraulic fluid pressure. These components are in an integral or unitized package which may be attached to a vehicle as a unit with a hydraulic pressure input line and a hydraulic return line connected thereto. The pressure input line communicates with a source of hydraulic pressure, such as a pump, and the return line returns fluid flow to a reservoir, or the like, which stores fluid for use by the pump.

The hydraulic system is closed, however, upon occasion air enters into the system and, depending upon the amount of air, can cause a very dangerous operating situation. For example, too much air in the system can result in a situation where, upon turning the wheels of a vehicle partially in one direction, they could continue to rotate in that direction as air trapped at one end or the other of the piston could be compressed, as compared to the normal situation where hydraulic fluid fills the chambers at either end of the piston to prevent the piston from moving. One of the ways in which air enters into the system is past the shaft seals in the hydraulic pump during cold weather.

One attempt to alleviate the situation is to provide manual bleeds in the system, however, such bleeds are only as effective as the human being relied upon to manually bleed the system and are in no way responsive to the needs of a particular system.

SUMMARY OF THE INVENTION

The present invention may be summarized as an integral power steering gear assembly of the type disclosed above including bleed valve means for automatically bleeding air from the fluid cavity in which the hydraulic piston is disposed. More specifically, the automatic bleed valve means includes a bleed valve member disposed in a passage and normally held away from a valve seat in that passage by a biasing means. The passage in which the valve member is disposed is in communication with the cavity in which the piston is disposed at a point high in that cavity because the air will move above the hydraulic fluid to the highest point in the cavity. The bleed valve means is in fluid communication with the return port of the assembly. The valve member has a clearance with the passage in which it is disposed to allow air to flow thereby but the clearance is not sufficient to allow excessive hydraulic fluid to flow thereby so that the valve member will move against the valve seat and prevent hydraulic fluid from moving there past.

BRIEF DESCRIPTION OF THE DRAWING

The DRAWING is a longitudinal cross-sectional view of an integral power steering gear assembly constructed in accordance with the instant invention.

DESCRIPTION OF THE PREFERRED EMBODIMENT

Referring to the drawing, a power steering assembly constructed in accordance with the instant invention is generally shown at 10. As alluded to hereinabove, the power steering assembly 10 is an integral power steering assembly forming one unitary package.

Broadly, the package includes a housing means, generally indicated at 12, and defining a power cavity 14. Piston means, generally indicated at 16, is movably supported in sealing and sliding relationship with the power cavity 14. A control valve means, generally shown at 18, controls pressurized fluid flow from an inlet 20 to the cavity 14 and return fluid flow from the cavity 14 to a return 22 whereby, depending upon the end of the piston means 16 to which fluid pressure is subjected, the piston means 16 will move in one of alternative and opposite directions. There is also included an input shaft means generally indicated at 24 for operating the control valve means 18.

There is also included output means, including an output shaft 26 and a gear sector 28 operatively connected to the piston means 16 for movement thereby. There is also included mechanical means comprising the coupling generally shown at 30, the helical ball screw drive, generally shown at 32, and the torsion rod 34 interconnecting the input shaft 24 and the output sector 28 through the piston means 16 for moving the output shaft 26 in response to rotation of input shaft 24 in the event of the lack or loss of hydraulic fluid pressure to move the piston means 16. The piston means 16 comprises a rack-toothed piston including a gear rack 36 which meshes with the gear sector 28, whereby the gear sector 28 rotates upon linear movement of the piston means 16. Should there be a loss of hydraulic fluid pressure, however, there is a mechanical means including a lost motion which will, at that end of that lost motion, move the piston means 16 in response to rotary movement of the input shaft 24, such mechanical means to be described hereinafter.

As set forth above, the present invention is directed to the bleed valve means generally shown at 38 for automatically bleeding air from the cavity 14 or, more specifically, from that portion of the cavity 14 surrounding the gear sector 28 and at the left end of the piston means 16. The package unit is attached to a vehicle by the flanges 40 in the position shown so that the bleed valve means 38 is disposed near the high point in the cavity 14. As will be appreciated, because of the viscosity of air as compared to that of hydraulic fluid, air will move to the highest point in the cavity above the hydraulic fluid.

The member 42 may be, for the purposes of description, referred to as part of the housing means 12, however, the central casting or member 12 is sometimes referred to as the housing with the member 42 being referred to as a valve cap, or the like; the important aspect being that the member 42 is bolted or otherwise secured to the central housing portion 12 so as to form a part thereof and a part of the total package. A fluid pressure port is in communication with the high pressure passage 20 and in a similar fashion a return port is in communication with the return passage 22. As alluded to above, the pressure port would be connected to a source of pressure, such as a pump, and the return port would be connected to a reservoir, or the like.

Bleed passage means defined by the passages 44a, 44b, and 46 communicate the bleed valve means 38 with the return passage 22. The passage 46 is bored in the member 42 and is capped or sealed by a ball or plug 48. The passage 44a is bored in the member 42 and is aligned with the passage 44b disposed in the central housing component. Thus, when considered as a package with the cap member 42 being considered a part of the housing means, the bleed passage means extends through the housing means to the control valve means 18.

The bleed valve means 38 includes a valve member 50 and a valve seat 52 for allowing the passage of air past the valve member 50 while preventing any substantial flow of pressurized hydraulic fluid past the valve member 50. More specifically, the valve member 50 is disposed in a clearance passage 54 which is, in turn, in communication with the cavity 14. A plug or spacer member 56 threadedly engages the housing 12 and extends into the clearance passage 54 for positioning the valve member 50. There is sufficient clearance between the valve member 50 and the clearance passage 54 to allow air to pass thereby. Extending downwardly from the clearance passage 54 is a seat passage 58 which is smaller than the clearance passage 54 so as to define the tapered valve seat 52. More specifically, the valve seat 52 is frusto-conical for engaging the lower sperical end of the valve member 50. The valve member 50 is cylindrical with spherical ends, the bottom one of which engages the seat 52. A biasing means, comprising at least one spring 60, is disposed in the seat passage 58 and extends past the valve seat 52 to engage the lower spherical end of the valve member 50. Thus, the spring 60 defines a biasing means for urging the valve member 50 against the spacing member 56 and away from the valve seat 52.

When air is trapped in the cavity 14, it will move past the valve member 50 because of the clearance between the valve member 50 and the clearance passage 54. However, when the valve member 50 is subjected to hydraulic fluid and the flow of that hydraulic fluid becomes sufficient because of its pressure, there will be a differential pressure across the valve member 50 such that the valve member 50 will be moved downwardly into sealing engagement with the valve seat 52 to prevent further fluid flow. Thus, the valve member 50 allows air to move there past because air will not create a sufficient pressure differential to close the valve whereas the valve member 50 will prevent any substantial flow of pressurized hydraulic fluid there past.

The remaining components which were broadly described above, are known in the prior art and therefore will not be described in great detail but only sufficiently to understand the total operation of the assembly. Further, reference may be had to U.S. Pat. No. 3,606,819 which is directed to an assembly of the same general type and including the same general components.

The piston means 16 comprises a centrally bored racktoothed piston dividing the power cavity 14 into a pair of pressure chambers, one at each end of the piston means 16. As mentioned hereinbefore, an output sector gear 28 is in meshing engagement with the rack 36 of the piston means 16, the output sector gear 28 being integrally or otherwise connected to the output shaft 26.

The input shaft 24 extends into the member 42 of the housing means and is rotatably supported thereby through various bearings, bushings, seals, and the like.

The control valve means 18 includes a sleeve valve member 62 as well as a portion of the input shaft for directing pressurized fluid to and for returning fluid from the pressure chambers at either end of the piston means 16. More specificallly, the sleeve valve member 62 and the input shaft 24 have axially extending slots and grooves which coact together to direct pressurized fluid to one end of the piston means 16 or the other while returning fluid flow from the opposite end.

A centrally bored worm member 64 is connected to the sleeve valve member 62 through an Oldham or other type coupling 30 for rotation therewith and extends into the bore of the piston 16. The worm 64 is operatively connected to the piston 16 through helical grooves and balls defining the helical screw means 32 to cause movement of the piston 16 in response to rotary movement of the worm 64. There is also included a coupling means interconnecting the input shaft 24 and end of worm 64, and hence the sleeve valve member 62 through the coupling 30, for allowing limited relative rotation between the shaft 24 and the sleeve valve member 62 on either side of a neutral position. The coupling means includes a lost motion connection between the shaft 24 and sleeve 62 to allow slight relative rotation therebetween and torsion means defined by the torsion rod 34 interconnecting the input shaft 24 and the worm 64 for urging the sleeve valve member 62 and the input shaft 24 to the neutral position.

The assembly also includes a relief valve assembly, which is generally shown at 66, for allowing fluid pressure to move from the pressurized end of the piston to the opposite end when the piston has bottomed out, as when the wheels have been turned all the way in one direction. The relief valve assembly prevents an undesirable pressure build-up in the pump supplying pressure. When the piston has bottomed out the adjacent or associated valve member will engage one or the other of the adjustment pins 68 or 70 to open whereby upon pressure build-up on the opposite pressurized end of the piston, the other or opposite valve member will open allowing fluid flow to the low pressure end of the piston and to return. Also, air trapped at the right end of the piston means 16 will pass through the relief valve assembly 66 or through the bored worm 64 to the left end of piston means 16 to be blead through bleed valve assembly 38.

OPERATION

As mentioned above, the assembly is a packaged integral unit with an input shaft and an output shaft with a hydraulic inlet port and a hydraulic outlet port. When placed in position that portion of the cavity 14 which is adjacent the bleed valve assembly 38 is placed at the highest position. It will be appreciated, however, that depending upon the environment in which the package is to be utilized, the bleed valve means 38 may be placed at different positions in the assembly but always adjacent the highest position as the assembly is installed.

When the assembly is installed, the input shaft 24 is connected to a steering shaft. To effect steering in one direction, the shaft 24 is rotated in one direction whereupon there will be a differential rotation between the shaft 24 and the sleeve valve 62 to direct fluid flow to one end or the other of the piston 16. The piston 16 will then move in one direction or the other to rotate the output shaft 26 through the gear sector 28. When the input shaft 24 has been rotated the desired amount, further rotation is discontinued and the torsion bar 34 will again align the sleeve valve member 62 with the input shaft 24 to prevent further fluid flow to or from either end of the piston 16, thus locking the piston in position (absent trapped air).

Should the shaft 24 be turned far enough that the piston 16 moves to an extreme position of travel, the relief valve assembly system 66 becomes effective to allow pressure from the pressurized end of the piston 16 to move to the low or return pressure side to prevent an excess of pressure built up on the pressurized side of the piston.

Should there be a loss of hydraulic fluid pressure, rotation of the shaft 24 effects a rotation of the worm 64 mechanically through the lost motion connection between shaft 24 and sleeve 62 and coupling 30, to, in turn, move the piston 16 through the helical ball screw means 32.

During normal operation should any air pass into the system, it will move to the top of the cavity 14 where it will be in communication with the valve member 50 so as to pass by the valve member 50 to the return passage 22. Should there be no air in the system, hydraulic fluid pressure will move the valve member 50 into engagement with the valve seat 52 to prevent the flow of hydraulic fluid to the return side of the system.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an enclusive property or privilege is claimed are defined as follows:

1. An integral power steering assembly comprising; housing means defining a power cavity, piston means movably supported in said cavity, control valve means supported by said housing means for controlling pressurized fluid flow to said cavity and return fluid flow from said cavity to move said piston means in alternative and opposite directions, input shaft means for operating said control valve means, output means operatively connected to said piston means for movement thereby, mechanical means interconnecting said input shaft means and said piston means for moving said piston neans in response to rotation of said input shaft means in the event of lack of fluid pressure to move said piston means, and bleed valve means for automatically bleeding air from said cavity, said bleed valve means including bleed passage means extending from and in direct communication with said cavity, a valve portion for controlling flow through said bleed passage means and movable between open and closed positions and normally open at any position of said piston means, biasing means for urging said valve portion toward said open position and away from said closed position in which said valve portion prevents flow through said bleed passage means, means in said bleed passage through said bleed passage means, a flow restriction in said bleed passage means normally open for allowing the free flow of air therepast and for creating a pressure differential between said bleed passage means upstream of said restriction and said bleed passage means downstream of said restriction in response to fluid flow therepast for moving said valve portion against said biasing means to said closed position to prevent flow of pressurized fluid past said valve portion in said closed position.

2. An integral power steering assembly comprising: housing means defining a power cavity, piston means movably supported in said cavity, control valve means supported by said housing means for controlling pressurized fluid flow to said cavity and return fluid flow from said cavity to move said piston means in alternative and opposite directions, input shaft means for operating said control valve means, output means operatively connected to said piston means for movement thereby, mehchanical means interconnecting said input shaft means and said piston means for moving said piston means in response to rotation of said input shaft means in the event of lack of fluid pressure to move said piston means, and bleed valve means remotely spaced from said control valve means for automatically bleeding air from said cavity, said bleed valve means including a valve member and a valve seat for allowing said passage of air past said valve member in an open position while preventing any substantial flow of pressurized fluid past said valve member in a closed position, said valve member closing in response to a pressure differential resulting from the flow of pressurized fluid past said valve member.

3. An assembly as set forth in claim 2 including pressure passage means in fluid communication with said control valve means for delivering pressurized fluid thereto from a source, return passage means in fluid communication with said control valve means for returning fluid to said source, and bleed passage means for communicating said bleed valve means with said return passage means.

4. An assembly as set forth in claim 3 wherein said control valve means is supported by said housing means and said bleed passage means extends through said housing means to said control valve means.

5. An assembly as set forth in claim 4 wherein said bleed valve means includes biasing means urging said valve member away from said valve seat.

6. An assembly as set forth in claim 5 wherein said valve member is disposed in a clearance passage which is in communication with said power cavity.

7. An assembly as set forth in claim 6 wherein there is sufficient clearance between said valve member and said clearance passage to allow air to pass thereby.

8. An assembly as set forth in claim 7 including a seat passage extending from said clearance passage, said valve seat being disposed between said clearance and seat passages, said seat passage being smaller than said clearance passage to define said valve seat.

9. An assembly as set forth in claim 8 wherein said valve member is cylindrical with at least one spherical end.

10. An assembly as set forth in claim 9 wherein said biasing means includes at least one spring disposed in said seat passage and extending past said valve seat to engage said spherical end of said valve member.

11. An assembly as set forth in claim 10 including pressure passage means in fluid communication with said control valve means for delivering pressurized fluid thereto from a source, return passage means in fluid communication with said control valve means for returning fluid to said source, and bleed passage means for communicating said seat passage with said return passage means.

12. An assembly as set forth in claim 11 wherein said control valve means is supported by said housing means and said bleed passage means extends through said housing means to said control valve means.

13. An assembly as set forth in claim 12 wherein said piston means comprises a centrally-bored rack-toothed piston dividing said power cavity into a pair of pressure chambers, said output means comprises an output shaft, an output sector gear in meshing engagement with said piston and connected to said output shaft, said input shaft extending into said housing means, said control valve means including a sleeve valve member and a portion of said input shaft means disposed within said sleeve valve member for directing pressurized fluid to and for directing return fluid from said pressure chambers, a centrally bored worm connected to said sleeve valve member for rotation therewith and extending into the bore of said piston, helical screw means operatively connecting said worm to said piston, coupling means interconnecting said input shaft means and said worm and hence said sleeve valve member for allowing limited relative rotation therebetween on either side of a neutral position, said coupling means including torsion means interconnecting said input shaft means and said worm for urging said sleeve valve member and said input shaft means to said neutral position.

14. A power steering assembly comprising; housing means defining a power cavity, piston means movably supported in said cavity, an input shaft, control valve means responsive to said input shaft for controlling fluid flow to and from said cavity to move said piston means in alternative and opposite directions, output means responsive to movement of said piston means, and bleed valve means spaced remotely from said control valve means for automatically bleeding air from said cavity, said bleed valve means including a valve member and a valve seat for allowing the passage of air past said valve member in an open position while preventing any substantial flow of pressurized fluid past said valve member in a closed position, said valve member closing in response to a pressure differential resulting from the flow of pressurized fluid pas said valve member.

* * * * *